Patented Nov. 10, 1953

2,658,875

UNITED STATES PATENT OFFICE 2,658,875

NICKEL CATALYST AND PREPARATION THEREOF

George Cornelis Adriaan Schuit and Jan Jacob Bernard van Eijk van Voorthuysen, Amsterdam, Netherlands, assignors to Shell Development Company, San Francisco, Calif., a corporation of Delaware No Drawing. Application March 19, 1951, Serial No. 217,404

Claims priority, application Netherlands March 27, 1950

4 Claims. (Cl. 252—452)

This invention relates to a new nickel catalyst having a superior heat stability and to a method for the preparation thereof.

The catalyst of the invention, broadly speaking, is prepared in a particular manner whereby the nickel in very dispersed and active form is deposited between plate-like layers of silica in a montmorillonite structure.

One of the very first metals found to possess catalytic properties was nickel. Nickel has been used as a catalyst for a large number of reactions and it has been prepared in a large number of ways as a catalyst for such uses. It is very active when properly prepared and can generally be used at quite low temperatures. Nickel has, however, the disadvantage of being particularly liable to sintering and, for this reason, it is generally unsuited for reactions requiring high temperatures. A certain improvement in this respect can be obtained by applying nickel in combination with certain other materials. One of such materials is silica. Nickel and silica can be combined in a number of ways such, for example, as by mechanical mixing, impregnating silica gel with a solution of a nickel salt, precipitating nickel carbonate or nickel sulfide on silica gel. These and most known methods simply result in an intimate physical mixture. It is also known to produce nickel silicate. The usual method for accomplishing this is, for example, to mix hot solutions of nickel nitrate and sodium silicate.

Most nickel compounds, e. g., nickel oxide, are quite easily converted to metallic nickel by reduction with hydrogen at moderate temperatures. Those catalysts prepared as mentioned where the nickel and silica are in physical rather than chemical combination are likewise quite easily reduced. When the nickel and the silica are combined as nickel silicate, the reduction is somewhat more difficult to effect. Upon reduction, the nickel silicate decomposes to $SiO_2$ and NiO, and the latter is reduced to metallic nickel which is dispersed throughout the silica. The nickel in this form is less prone to sinter, and catalysts prepared in this manner are therefore more stable against heat than the usual free nickel catalysts. They are, however, damaged by overheating and are not generally suitable for operations where high temperatures are required. For example, in the reaction of hydrocarbons with carbon dioxide, temperatures between 600° C. and 800° C. are desired. A nickel catalyst made by distributing nickel in a refractory cement has been used for this reaction, but it is generally necessary to resort to the use of a different catalyst containing a less sinterable, and consequently more active, material such as chromium oxide.

The catalyst of the present invention is prepared in a special manner whereby the nickel in a finely dispersed state is deposited between plate-like layers in a montmorillonite structure. This catalyst is stable up to temperatures of about 1000° C.

If a hot solution of nickel nitrate is added slowly to a hot solution of alkali silicate, a nickel hydrosilicate is formed. The nickel hydrosilicate is found by thermal analysis to have a decomposition temperature of about 450° C. No nickel hydroxide (decomposition temperature 350° C.) is found either by thermal analysis or by an X-ray analysis. If the order of addition of the solutions is reversed, i. e., the hot solution of alkali silicate is slowly added to a hot solution of nickel nitrate, the results are the same. If the nickel is precipitated in a suspension of silica gel in nickel nitrate solution, the results are again the same. The nickel silicate thus formed appears to be an intermediate between nickel hydroxide and nickel hydrosilicate with isolated $SiO_4$ groups replacing OH groups of $Ni(OH)_2$.

If such materials are subjected to a suitable hydrothermal treatment, i. e., treatment with water at high temperature, they are converted into other silicates. Such other nickel silicates can be produced even from mechanical mixtures of nickel hydroxide and silica gel if the hydrothermal treatment is sufficiently severe.

There are two such silicates that can be formed by the mentioned hydrothermal treatment. One of these has a structure resembling kaolin and is called nickel antigorite; the other has the structure of montmorillonite, i. e., the octahedrally sheathed aluminum atom of natural montmorillonite is replaced by nickel. This material is called nickel montmorillonite. In the nickel montmorillonite, the nickel exists in layers flanked on either side by plate lattices of $Si_2O_5$ formed by replacement of OH groups of the nickel hydroxide by SiOH complexes. This structure is exceedingly stable, whereas that of the nickel antigorite is not. The catalyst of the invention has this montmorillonite structure which is identifiable by X-ray analysis and electron diffraction analysis. Also the nickel montmorillonite may be identified and determined by thermal analysis (decomposition temperature 950° C).

While these two silicates can be formed under the same conditions of hydrothermal treatment, it is found that either can be formed to the substantial exclusion of the other merely by controlling the ratio of nickel to silicon in the starting mixture. The nickel antigorite is believed to have the formula $Ni_3(OH)_4Si_2O_5$, whereas the nickel montmorillonite is believed to have the formula $Ni_3(OH)_2Si_4O_{10}$. Whether these formulae are correct or not, it is found that when the atomic ratio of nickel to silicon in the material is from about 1:1 to about 1:3, the desired montmorillonite structure is formed, whereas higher ratios tend to give material of the antigorite structure. At lower ratios, e. g., 1:3 or lower, appreciable amounts of free silica are also present. Since the nickel antigorite decomposes already at 615–630° C., it is desired that at least the major part of the nickel silicate be of the desired montmorillonite structure. The atomic ratio of silicon to nickel should, therefore, be at least 1:1 and preferably 4:3 or higher.

The catalyst of the invention can be prepared either from the precipitated nickel hydrosilicate or from mechanical mixtures of nickel hydroxide and undried silica gel. However, a more drastic and prolonged hydrothermal treatment is required to produce the well defined nickel montmorillonite in the latter case and, consequently, it is preferred to start with the precipitated nickel hydrosilicate. The nickel hydrosilicate may be prepared by one of the methods described above, or by other methods. It is preferred, however, that the nickel hydrosilicate be fresh and undried. Drying and calcining tend to produce a partially dehydrated xerogel which is more difficult to convert to the desired structure by a reasonable hydrothermal treatment.

The minimum necessary hydrothermal treatment depends upon the age and condition of the nickel silicate starting material. Nickel hydrosilicate produced at 60–100° C. by very slow precipitation over 6–8 hours may be converted to the desired nickel montmorillonite structure by treatment in water at 90–100° C. To obtain a material consisting largely of the nickel montmorillonate, it is necessary to continue the treatment for a long time. It is, therefore, preferred to treat the material at a higher temperature under pressure. By the application of higher temperatures more complete conversion to the desired structure can be obtained in a reasonable time. At a temperature of 250° C. it is preferred to continue the hydrothermal treatment for at least four hours. We have in many cases treated our catalysts in an autoclave at 250° C. for about 50 hours. While such drastic treatment gives well crystallized nickel montmorillonite, it is not essential to the production of an active catalyst which is sufficiently stable for most high temperature applications.

It has, furthermore, been found that when forming the desired nickel montmorillonite compound by hydrothermal treatment at a temperature above 100° C. (under pressure), the desired conversion is catalyzed by the presence of an alkaline compound of sodium or potassium, e. g., $NaOH$, $KOH$, $Na_2CO_3$. It is important, however, that the amount of such alkali be carefully regulated not to exceed about 1.5 parts sodium or potassium (calculated as the oxide) to about four parts of silica. Thus 0.08 to 1.5 parts of sodium oxide to 3 parts of nickel oxide and 4 parts of silica promote the formation of the desired nickel montmorillonite compound in the hydrothermal treatment, whereas larger amounts lead to the formation of a nickel mica.

After hydrothermally treating the material with water at a temperature of at least 90° C. for a time sufficient to convert at least the larger part of the nickel silicate to the desired nickel montmorillonite, the material is dried and subjected to a reduction treatment with hydrogen. The reduction treatment should be carried out at a temperature and for a time to reduce at least half of the nickel to the metallic state. This requires fairly drastic reduction conditions at a temperature above at least 425° C., and preferably between 500° C. and 700° C. When using dry hydrogen, the reduction requires at least 4 hours, and usually considerably longer. A complete reduction of all of the nickel is not necessary nor desirable. A reduction from 50% to 90% of the nickel is recommended.

As pointed out above, it is preferred to start with a precipitated nickel hydrosilicate having an atomic ratio of silicon to nickel of 4:3 and preferably somewhat higher in order to insure the formation of the desired nickel montmorillonite to the substantial exclusion of the nickel antigorite. When a ratio above 4:3 is employed in preparing the nickel hydrosilicate, the final product contains free silica. The activity of the catalyst of the invention can be improved in such cases by incorporating in the catalyst a small amount of alumina and/or fluorine.

Thus, the catalyst may be impregnated with an aluminum salt such as the chloride, nitrate, sulfate and then calcined. The amount of alumina is preferably between 5% and 25% of the free silica and is preferably incorporated after the formation of the desired nickel montmorillonite. After incorporating alumina the catalyst may be treated with a dilute aqueous solution of hydrofluoric acid (e. g. 10% solution) for a short time to incorporate between about 0.1% and about 5% of fluorine, based on the alumina. Catalysts so promoted are not only stable but have improved activity for cracking, dealkylation and isomerization.

*Example*

A hot solution of nickel nitrate (0.2 molar) was slowly added during 7 hours to an equal volume of hot 0.4 N sodium hydroxide. After standing for 17 hours, the suspension was boiled for an additional 7 hours. The final pH was 7. After cooling, the precipitate was filtered and washed. The precipitate was suspended in a 0.2 molar solution of $Na_2SiO_3$ in an amount to give an equal molecular ratio of nickel to silicon. A solution of nitric acid (4N) was slowly added to the boiling suspension to bring the pH to 7. The resulting product was filtered, washed and dried. This product showed a peak at 401° C. on thermal analysis. This, and X-ray analysis, show that the nickel was present mainly as the hydroxide. The material was then heated in water in an autoclave for 52 hours at 250° C. The resulting product was the desired nickel montmorillonite, as shown by thermal analysis and X-ray analysis. Whereas the nickel antigorite decomposes at about 650° C., the nickel montmorillonite was stable up to above 900° C. Whereas the material prior to the hydrothermal treatment was 50% reduced by treatment with hydrogen for 16 hours at 335° C., a temperature of 540° C. is required to effect an equal reduction of the hydrothermally treated nickel montmorillonite.

If nickel nitrate solution is slowly added to a boiling solution of $K_2SiO_3$ until the ratio of Si/Ni is 1.36 a nickel hydrosilicate is formed which upon treatment in water for about 50 hours at 250° C. is converted into the nickel montmorillonite. When the nickel nitrate is added until the ratio of Si/Ni is 0.70, the resulting product is nickel antigorite.

We claim as our invention:

1. A process for the production of a nickel containing catalyst which comprises precipitating nickel hydroxide and hydrous silica, the molecular ratio of the amounts of silica to nickel applied being at least 1:1, treating the precipitate with water under pressure at a temperature above 100° C. until at least half of the nickel is converted to nickel montmorillonite, and then subjecting the product to a reduction treatment at a temperature of at least 425° C. until at least half but not all of the nickel of the nickel montmorillonite is reduced to metallic nickel.

2. A process for the production of a nickel containing catalyst which comprises precipitating nickel hydroxide and hydrous silica, the molecular ratio of the amounts of silicate to nickel applied being at least 1:1, treating the precipitate with water under pressure at a temperature above 100° C. in the presence of between 0.8 and 1.5 parts of sodium oxide to 4 parts of silica until at least half of the nickel is converted to nickel montmorillonite, and then subjecting the product to a reduction treatment at a temperature of at least 425° C. until at least half but not all of the nickel of the nickel montmorillonite is reduced to metallic nickel.

3. A process for the production of a nickel containing catalyst which comprises precipitating silica and nickel hydroxide in a molecular ratio above 4:3, treating the precipitate with water at a temperature of at least 90° C. until at least half of the nickel is converted to crystalline nickel montmorillonite, impregnating the nickel montmorillonite containing free silica with from 5 to 25% alumina based on the free silica, and then subjecting the product to a reduction treatment at a temperature of at least 425° C. until at least half but not all of the nickel of the nickel montmorillonite is reduced to metallic nickel.

4. A process according to claim 3 further characterized in that the product is treated with aqueous hydrogen fluoride to incorporate between 0.1 and 5% by weight fluorine based on the amount of alumina.

GEORGE CORNELIS ADRIAAN SCHUIT.
JAN JACOB BERNARD van EIJK
  van VOORTHUYSEN.

References Cited in the file of this patent

UNITED STATES PATENTS

| Number | Name | Date |
|---|---|---|
| 2,525,354 | Hoog et al. | Oct. 10, 1950 |
| 2,548,159 | Houtman et al. | Apr. 10, 1951 |

FOREIGN PATENTS

| Number | Country | Date |
|---|---|---|
| 13,382 | Great Britain | May 28, 1914 |